United States Patent
Tse

(10) Patent No.: US 6,622,812 B1
(45) Date of Patent: Sep. 23, 2003

(54) VEHICLE WINDOW TRANSMISSIVITY CONTROL

(76) Inventor: Ho Keung Tse, P.O. Box 54670, North Point Post Office, Hong Kong (CN)

( * ) Notice: Subject to any disclaimer, the term of this patent is extended or adjusted under 35 U.S.C. 154(b) by 0 days.

(21) Appl. No.: 09/806,018

(22) PCT Filed: Oct. 28, 1999

(86) PCT No.: PCT/IB99/01755

§ 371 (c)(1),
(2), (4) Date: Mar. 26, 2001

(87) PCT Pub. No.: WO00/24601

PCT Pub. Date: May 4, 2000

(30) Foreign Application Priority Data

Oct. 28, 1998 (GB) .............................................. 9823573
Jan. 25, 1999 (GB) .............................................. 9901604

(51) Int. Cl.⁷ .............................................. B60R 21/00
(52) U.S. Cl. ....................................................... 180/271
(58) Field of Search ...................... 701/36, 49; 180/271

(56) References Cited

U.S. PATENT DOCUMENTS

| | | | | | |
|---|---|---|---|---|---|
| 4,614,415 | A | * | 9/1986 | Hyatt | 345/84 |
| 4,749,261 | A | * | 6/1988 | McLaughlin et al. | 349/104 |
| 4,988,140 | A | * | 1/1991 | Van Order | 359/265 |
| 5,620,799 | A | * | 4/1997 | Sauer | 359/270 |
| 5,677,526 | A | * | 10/1997 | Hattori | 250/206 |
| 5,712,709 | A | * | 1/1998 | Task et al. | 356/239.1 |
| 5,764,402 | A | * | 6/1998 | Thomas et al. | 701/50 |
| 5,946,012 | A | * | 8/1999 | Courian et al. | 296/211 |
| 6,002,511 | A | * | 12/1999 | Varaprasad et al. | 359/241 |
| 6,039,390 | A | * | 3/2000 | Agrawal et al. | 359/604 |
| 6,246,505 | B1 | * | 6/2001 | Teowee et al. | 250/214 R |
| 6,247,820 | B1 | * | 6/2001 | Van Order | 701/51 |
| 6,346,698 | B1 | * | 2/2002 | Turnbull | 345/105 |

* cited by examiner

Primary Examiner—Lesley D. Morris
Assistant Examiner—L. Lum

(57) ABSTRACT

A system which determines whether a vehicle is in forward motion or not, and to disable dangerous command(s) which changes transmissivity of controllable window(s) of that vehicle to an unacceptable level, in an automatic manner if the vehicle is determined as in forward motion.

8 Claims, 1 Drawing Sheet

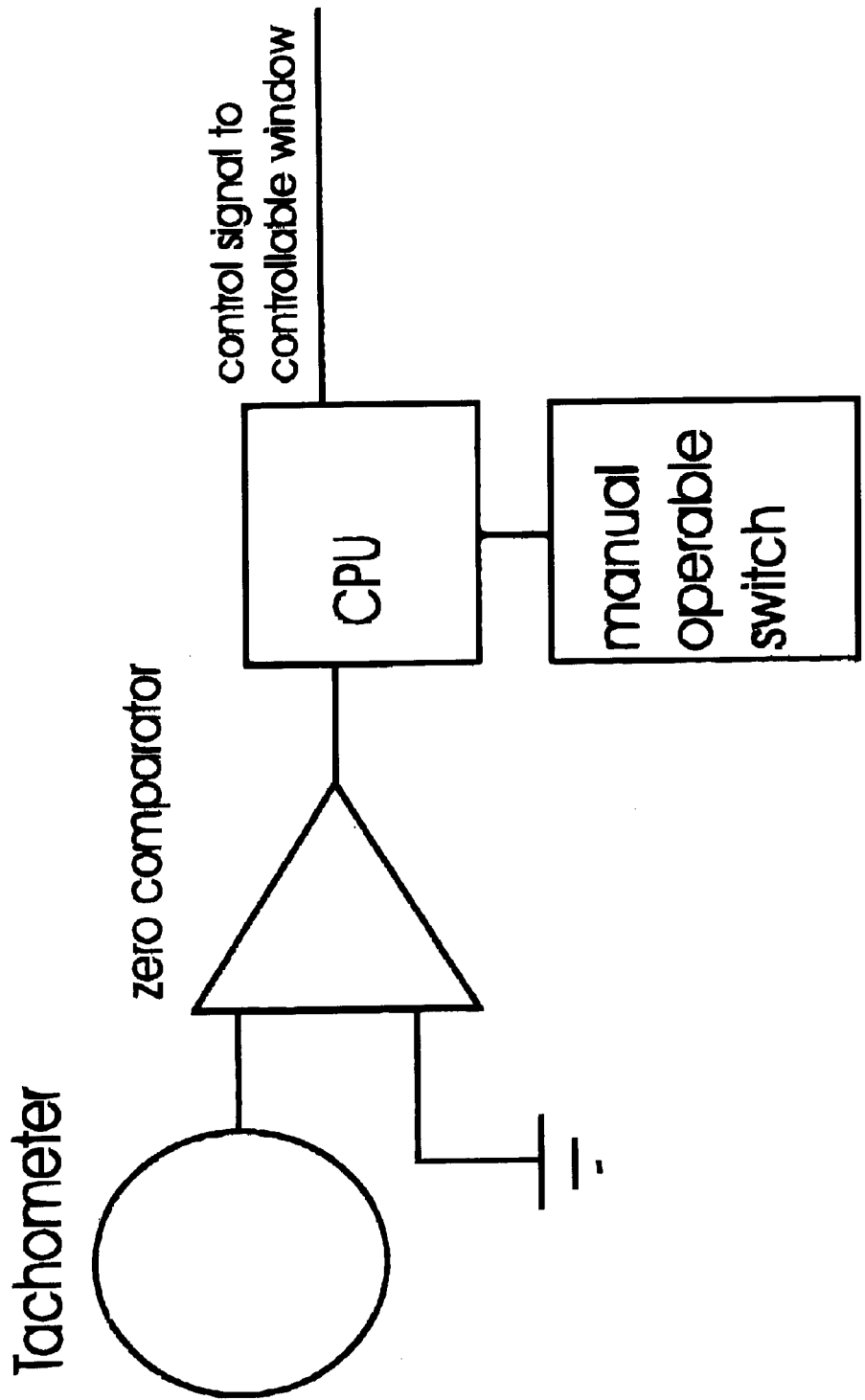

VEHICLE WINDOW TRANSMISSIVITY CONTROL

FIELD OF THE INVENTION

The present invention relates to vehicle automatic control system, and particularly, to an automatic system for maintaining transmissivity of vehicle window(s) to a safety level, when the vehicle is moving.

BACKGROUND OF THE INVENTION

Applying controllable windows, i.e., windows which transparency is controllable, to a vehicle such as automobile, aeroplane or ship is well known to those in the art, for providing privacy to occupant therein when the vehicle is not moving.

Such a controllable window, although desirable, can be a potential danger to the occupant(s) therein, including driver. Because it requires a manual operable switch to be disposed in the interior of the vehicle for an occupant to control the transmissivity thereof, and it will then be possible that an occupant who may be a child, or even driver himself, may inadvertently switch the manual switch and cause the controllable window(s) to become opaque or a very low level transmissivity and blind the driver from seeing anything outside clearly when the vehicle is moving at great speed.

It is therefore an object of the present invention to improve such vehicle electronic controllable windows such that it will not blind the driver from seeing the outside view and permit the driver has a good enough outside view, when the vehicle is moving.

DRAWING

FIG. 1 is a block diagram of the present control system for vehicle controllable window.

DETAILED DESCRIPTION OF THE PREFERRED EMBODIMENTS

Please refer to FIG. 1, which is a block diagram of the present control system. As seen, the tachometer of the vehicle outputs an analogue signal which value is proportional to the moving speed of the vehicle, the signal will be "zero-value" if the vehicle is not moving and the signal is being feed into an input of the zero comparator which is an operational amplifier. The other input of the operational amplifier is ground so that its output will go "high" if the signal from the tachometer is non-zero and its output is "low" if the difference between its 2 inputs is "0", that is, the signal from the tachometer is zero. The output of the operational amplifier is supplied to an input port of the CPU. When in operation, the CPU can determine when/whether the vehicle is moving from that input port, if it is "high", then the CPU will know the vehicle is moving, otherwise the vehicle is not moving. It should be noted that the above-mentioned means for detecting whether a vehicle is in operation, can also be designed in other ways, such as, detecting movement of steering-wheel or other user-operable parts of a vehicle which will be operated by a driver when the vehicle is in operation. The position of gearbox selector rod can tell whether the vehicle is in forward or backward movement direction, from whether forward or rear gear is selected. And, U.S. Pat. No. 5,845,538 discloses a "Device for detecting vehicle gearbox selector rod position". Further, by sensing the electric energy supplied to the turn signal light emitter, whether a vehicle will be turned left or right can be determined.

When in operation, the above-mentioned manual operable switch is used for receiving commands from user to the CPU to cause the controllable window(s) of the vehicle to be darkened to different levels. In this embodiment, different user-selectable commands are available for setting the controllable window(s) to respectively different predetermined transmissivity levels.

The CPU, in response to the command received by the manual switch, will first determine if the level of darkness requested by the command will block outside view, by comparing it with a minimum level of transmissivity required. If not, it will carry out the command.

Otherwise, the CPU will determine if the vehicle is moving or not, if the vehicle is not moving, it will also carry out the command.

Otherwise, the CPU will determine whether the controllable window(s) selected to be darkened is the window(s) which if darkened to an unacceptable level, will block the driver's outside view, by comparing the identity of the controllable window(s) to be darkened against a list stored in a memory of itself, and of course, this depends on which direction of movement the vehicle will be or is going to, including forward, backward, turn left or right, and different directions may require the use of a different list.

Those selected controllable window(s) whose identity (ies) readable on the active list will not be affected by the user command. For the others, the CPU will send a control signal thereto in corresponding to the command.

It should be noted that when the vehicle changes the movement direction and is detected, a new list will be active for use and CPU will check if any previously darkened controllable window(s) is in the list and cause them to become transparent immediately.

Alternatively, the user command input means may be a touch screen display with touch sensitive key thereon for receiving commands. And in this case, information of/representative of the command(s) which is not going to be accepted and inactive when the vehicle is moving, will not be displayed and those inactive commands cannot be inputted.

It should be noted that the above embodiments are given by way of example only, and it will be obvious to those skilled in the art that various changes and modifications may be made without departing from the spirit of the present invention.

For instance, the controllable window may comprise a light blocking element which may be a window blind or the like, physically separate from a piece of transparent glass of the controllable window, to control the transmissivity of the window.

For another instance, whether a vehicle is in motion can also be detected by the sensor as disclosed by U.S. Pat. No. 5,444,430, invented by McShane, title "Motor vehicle security system", against carjacking. And, as readable on the Detailed Description thereof, first paragraph, a magnet is to be mounted on the periphery of the rear axle which drives rear wheel and a magnetic sensor is used for sensing the magnetic flux produced by the magnet, to produce a electrical pulse upon each revolution on the axle.

What is claimed is:

1. Apparatus for use in controlling a vehicle, comprising:
    determining means for determining whether said vehicle is moving forward;
    receiving means for receiving user actuation for controlling transmissivity of said window, and in response thereto, generating corresponding command signals;

disabling means for disabling of said receiving means, in such a manner that said receiving means becomes incapable of generating an effective said command signal which can change the transmissivity of said window to a dangerous level for forward driving, if said vehicle is being determined as moving forward by said determining means.

2. A method for use in controlling transmissivity of a window of a vehicle, comprising the steps of:

determining whether said vehicle is moving forward;

causing at least one user-selectable command to become inactive if said vehicle is determined as moving forward;

wherein said at least one user-selectable command being for setting the transmissivity of said window to a comparatively low level.

3. A window system of a vehicle, comprising:

determining means for determining whether said vehicle is moving forward;

means for preventing transmissivity of a window of said system from being controlled by a user to a dangerous level for forward driving, if said vehicle is being determined as moving forward by said determining means.

4. A method for use in controlling a window of a vehicle, comprising the steps of:

determining whether said vehicle is moving forward;

preventing transmissivity of said window from being controlled by a user to below a predetermined level, if said vehicle is being determined as moving forward in said determining step.

5. A method as claimed by claim 4, wherein said vehicle being a car and said determining step comprising the steps of:

a) determining whether said vehicle's speed tachometer is outputting a non-zero value;

b) determining whether forward gear is selected;

c) determining said vehicle as moving forward if results of steps a) and b) are both positive.

6. A method for use in controlling transmissivity of a window of a vehicle, comprising the steps of:

determining whether said vehicle is moving forward;

preventing transmissivity of said window from being controlled by a user to a comparatively low level, if said vehicle is being determined as moving forward in said determining step.

7. Apparatus for use in controlling transmissivity of a window of a vehicle, comprising:

means for obtaining status of said vehicle;

means for preventing transmissivity of said window from being controlled by a user to a comparatively low level, if said status of said vehicle being in forward movement operation.

8. A method for use in controlling transmissivity of a window of a vehicle, comprising the steps of:

obtaining status of said vehicle;

preventing transmissivity of said window from being controlled by a user to from a comparatively high level to a comparatively low level, if said status of said vehicle being in forward movement operation.

* * * * *